UNITED STATES PATENT OFFICE.

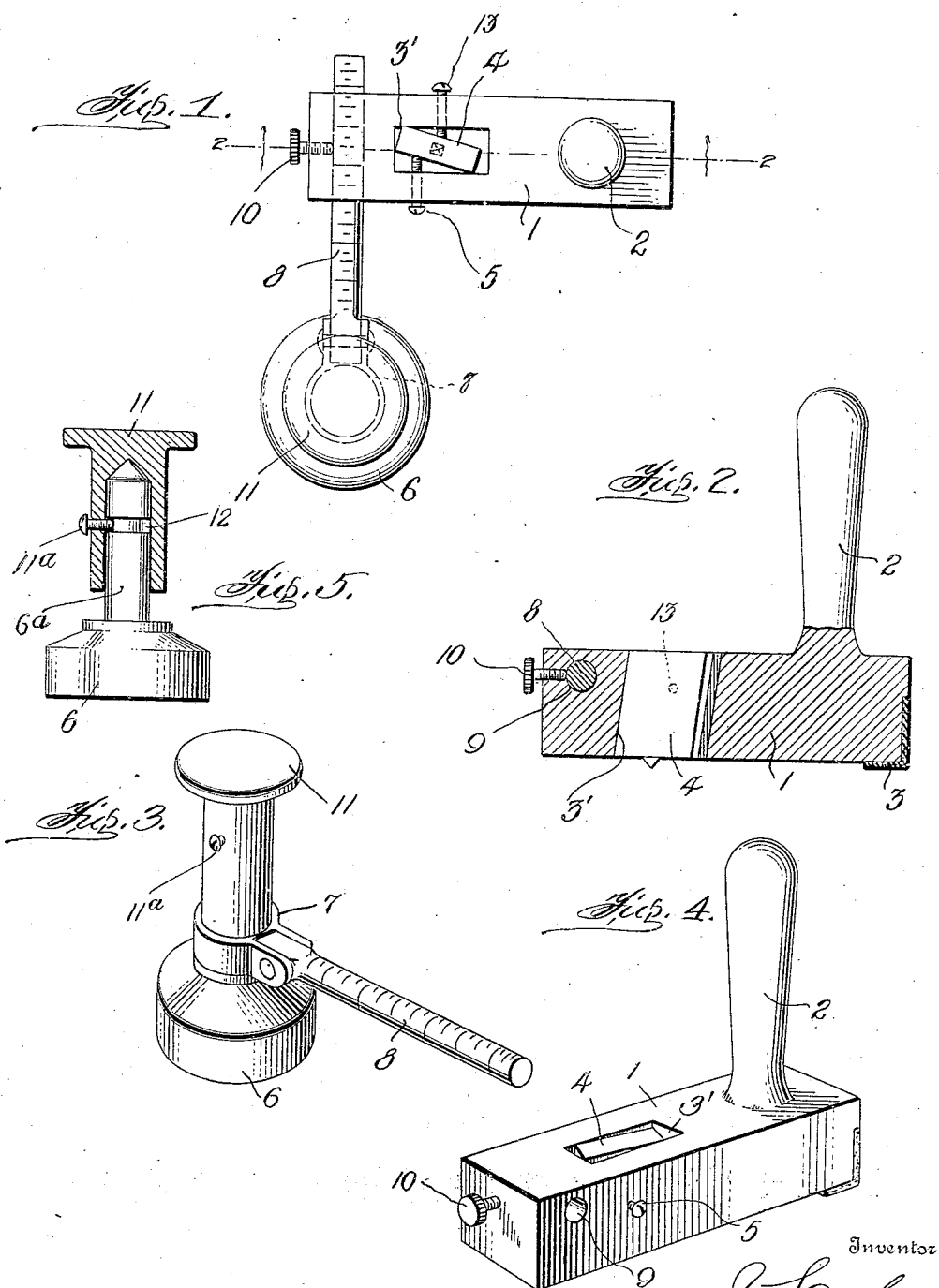

JOHN LAMB, OF SAN FRANCISCO, CALIFORNIA.

GLASS-CUTTING TOOL.

939,843.  Specification of Letters Patent.  Patented Nov. 9, 1909.

Application filed January 18, 1909. Serial No. 472,865.

*To all whom it may concern:*

Be it known that I, JOHN LAMB, a subject of the King of England, residing at San Francisco, in the county of San Francisco and State of California, have invented certain new and useful Improvements in Glass-Cutting Tools, of which the following is a specification.

This invention consists of a small tool of novel construction designed particularly for cutting large plate glass, and embodying a peculiar attachment whereby the same is susceptible of advantageous use for the purpose of cutting circular pieces of glass whenever desired. The attachment is so combined with the main tool as to permit of adjustment whereby circular pieces of glass of different sizes may be cut, and in a manner which will be described more fully hereinafter.

For a full understanding of the invention, reference is to be had to the following detail description and to the accompanying drawings, in which—

Figure 1 is a top plan view of a device embodying the essential features of the present invention; Fig. 2 is a vertical longitudinal sectional view showing the construction of the body of the cutting tool more clearly; Fig. 3 is a perspective view of the attachment to be used for cutting circular glass; Fig. 4 is a perspective view of the cutting tool alone; and Fig. 5 is a sectional view of the stationary parts of the circular cutting attachment.

Throughout the following detail description and on the several figures of the drawings similar parts are referred to by like reference characters.

Referring particularly to the drawings and specifically describing the invention, the numeral 1 denotes the body of my cutting tool, the same comprising a guide block of suitable length and width, the same being shown of somewhat rectangular form, though this is not essential to the invention. Projecting upwardly from the guide block 1 is a handle 2 which is grasped by the operator in the actual use of the invention, the front end of the block 1 being provided with a wiper 3, the lower portion of which extends beneath the part 1 as shown most clearly in Fig. 2 of the drawings. Intermediate of its ends the block 1 is provided with a vertical slot or socket 3' and in this socket 3' is mounted a diamond holder 4 which constitutes the cutter, and which is held in an adjusted position by means of a suitable set screw 5 arranged transversely of the socket 3'. It is contemplated that any holder 4 may be used in connection with the guide block 1, it being very easy to remove that carried by the part 1 whenever it is desired to substitute another diamond in the operation of the invention.

The attachment whereby the invention may be readily adapted for use for cutting circular pieces of glass consists of a base 6, preferably of somewhat circular form and upon which is carried a rotatable member 7. Extending from the rotatable member 7 is a gage bar 8, the latter being supplied with a suitable measuring scale, and said bar 8 is adapted to enter an opening 9 formed in the end portion of the block 1 more remote from the handle 2. The opening 9 extends transversely through the block, and a set screw 10, arranged for adjustment lengthwise of the part 1, is adapted to engage the bar 8 after the same has been introduced into the opening 9 to thereby secure the guide block 1 at a suitable adjustment with respect to the base 6 of the circular cutting attachment. A handle 11 forming a part of the attachment aforesaid and adjacent to the base 6 is adapted to be held firmly when the parts are assembled as shown in Fig. 1, and it will be apparent that by operating the handle 2 the guide block 1 with its cutting diamond may be caused to move on the arc of a circle to cut out a circular piece of glass. As the block 1 operates in a circular path about the base 6 the rotatable section 7 upon the base revolves in an evident manner.

By reference to Fig. 5 it will be observed that the base 6 is formed with an upwardly projecting stem 6ª having an annular groove 12 in its intermediate portion. A screw 11ª carried by the handle 11 is adapted to engage at its inner end in the groove 12 to secure the handle to the stem 6ª and thereby hold the parts 6, 7, and 11 connected. As will be noted by reference to Fig. 1 the diamond holder 4 is smaller than the socket 3' and is not only adapted to be engaged by the adjusting screw 5 before referred to, but on the opposite side of the member 1 is located a set screw 13. The said screw 13 is adapted to engage the holder 4, as well as the screw 5, so that the holder may be held in clamped position diagonally in the socket 3' to facilitate the cutting of small circular pieces of glass.

The member 7 is pivotally connected at 8ª with the adjacent end of the gage bar 8, and thus should it be desired to quickly use the device for straight cutting work, not, however, detaching the attachment for circular cutting, it is only necessary to turn the handle 11 on the pivot 8ª so that it rests on the bar 8 practically and the base 6 is off the surface operated on.

Having thus described the invention, what is claimed as new, is:

In a glass cutting tool, the combination with a guide block, a handle for operating the same, and a cutter carried by said block, of an attachment for circular glass cutting comprising a base provided with an upwardly projecting stem having an annular groove at its upper portion, a rotatable member mounted on the lower portion of the stem, a handle arranged on the upper portion of the stem and engaging the upper portion of the rotatable member to hold the same in place, a screw passing through the handle and entering the groove in the stem to prevent displacement of the handle, a gage bar pivotally connected at one end with the rotatable member of the stem and provided with graduations on its surface longitudinally thereof, and a fastening screw passed through the guide block for engagement with the gage bar to adjustably connect the parts together.

In testimony whereof I affix my signature in presence of two witnesses.

JOHN LAMB.

Witnesses:
  C. H. NIXON,
  GUY F. KIRNER.